(12) United States Patent
Boucher

(10) Patent No.: US 10,062,975 B2
(45) Date of Patent: Aug. 28, 2018

(54) BATTERY CONNECTOR

(71) Applicant: TERMACO LTEE, Saint-Jean-sur-Richelieu (CA)

(72) Inventor: Gilles Boucher, LaSalle (CA)

(73) Assignee: TERMACO LTEE, Saint-Jean-sur-Richelieu (CA)

( * ) Notice: Subject to any disclaimer, the term of this patent is extended or adjusted under 35 U.S.C. 154(b) by 0 days.

(21) Appl. No.: 15/611,391

(22) Filed: Jun. 1, 2017

(65) Prior Publication Data

US 2017/0352964 A1 Dec. 7, 2017

Related U.S. Application Data

(60) Provisional application No. 62/344,175, filed on Jun. 1, 2016.

(51) Int. Cl.
| | |
|---|---|
| *H01R 24/00* | (2011.01) |
| *H01R 4/34* | (2006.01) |
| *H01R 25/16* | (2006.01) |
| *H01M 2/20* | (2006.01) |

(52) U.S. Cl.
CPC .............. *H01R 4/34* (2013.01); *H01M 2/202* (2013.01); *H01R 25/162* (2013.01)

(58) Field of Classification Search
CPC .................................................... H01R 11/289
USPC .......................... 439/627, 776, 766; 429/121
See application file for complete search history.

(56) References Cited

U.S. PATENT DOCUMENTS

| | | | | |
|---|---|---|---|---|
| 1,108,883 | A | * | 9/1914 | Bijur ....................... H01M 2/30 180/68.5 |
| 1,316,034 | A | * | 9/1919 | Hazelett ............... H01R 11/283 439/766 |
| 1,770,975 | A | * | 7/1930 | Everett ................... H01M 2/30 429/121 |

(Continued)

FOREIGN PATENT DOCUMENTS

CA 2558525 4/2007

OTHER PUBLICATIONS

EnerSys, "The world's first 16V Front Terminal UPS battery", Publication No. US-HXFT-RS-002—Nov. 2011, [online], Available from (www.enersys.com.cn/uploadfiles/main/files/2013/4/20130412100346.pdf).

*Primary Examiner* — Neil Abrams
(74) *Attorney, Agent, or Firm* — Benoit & Cote Inc.; C. Marc Benoit

(57) ABSTRACT

A connector assembly for electrically connecting poles of two adjacent battery cell. The connector assembly comprises an electrically conductive bus bar having a first connection area and a second connection area distal from each other, electrically conductive pole-mating components having a pole-mating face and a bar-mating face, and fastening components for attaching the electrically conductive bus bar and one of the pole-mating components to one of the poles of the two adjacent battery cells. The pole-mating faces of the pole-mating components are adapted for mating the poles the battery cells. The bar-mating faces of the pole-mating components are adapted for mating with the connection areas. The bar-mating faces and the connection areas have complementary concave/convex arched shape for optimizing contact surface over a range of relative positioning of the two adjacent battery cells.

19 Claims, 8 Drawing Sheets

(56) References Cited

U.S. PATENT DOCUMENTS

| | | | |
|---|---|---|---|
| 3,711,335 A | 1/1973 | Daniel | |
| 3,992,075 A * | 11/1976 | Cannarsa | H01R 11/289 439/755 |
| 5,663,012 A * | 9/1997 | Shannon | H01M 2/206 429/121 |
| 6,398,595 B2 * | 6/2002 | Wakata | H01R 11/282 429/1 |
| 7,972,185 B2 | 7/2011 | Kim | |
| 8,133,607 B1 * | 3/2012 | Chen | H01M 2/1077 320/112 |
| 8,409,749 B2 | 4/2013 | Nishino et al. | |
| 8,556,665 B2 | 10/2013 | Schuppli | |
| 8,574,008 B2 * | 11/2013 | Große | H01M 2/202 439/627 |
| 8,603,663 B2 | 12/2013 | Park et al. | |
| 8,703,312 B2 | 4/2014 | Kim | |
| 9,070,939 B2 * | 6/2015 | Guen | H01M 2/206 |
| 9,088,040 B2 | 7/2015 | Kinoshita et al. | |
| 9,166,211 B2 | 10/2015 | Ogasawara et al. | |
| 9,337,464 B2 * | 5/2016 | Wiegmann | H01M 2/202 |
| 2006/0094289 A1 | 5/2006 | Kim et al. | |
| 2011/0293998 A1 | 12/2011 | Sato et al. | |
| 2013/0071721 A1 | 3/2013 | Ogasawara et al. | |
| 2013/0130572 A1 | 5/2013 | Sakae | |
| 2014/0030933 A1 | 1/2014 | Wiegmann et al. | |
| 2015/0311570 A1 | 10/2015 | Adachi et al. | |
| 2017/0352964 A1 * | 12/2017 | Boucher | H01R 4/34 |

\* cited by examiner

BATTERY CONNECTOR

CROSS-REFERENCE TO RELATED APPLICATION

This application claims priority from U.S. patent provisional application 62/344,175 filed Jun. 1, 2016, the specification of which is hereby incorporated herein by reference in its entirety.

BACKGROUND

(a) Field

The subject matter disclosed generally relates to battery assemblies. More particularly, the subject matter disclosed relates to battery connectors.

(b) Related Prior Art

In the field of battery connectors, there exists a need for solutions to connect a series of battery cells in series. There is therefore a need to ensure the connections of the battery cells in different configurations, in order to ease the installation and maintenance of the stacks of battery cells, and to ensure the quality of the connection between the battery cells.

One particular challenge in the connection of battery cells in series consists in having them aligned in a precise position such as to ensure that the connecting component connecting the battery cells are providing the optimum connection, while ensuring a connection assembly that involves as few components as possible for keeping the cost of installation and maintenance low.

Some of the prior art efforts include U.S. Pat. No. 7,972,185 B2 that describes a connector for battery terminals featuring a connection member with protrusion to improve contact with fastening nuts; US Publication 2014/0030933 A1 that describes a connecting element with contact faces surfaced with cross-groove arrangement to improve electrical contact; US Publication 2006/0094289 A1 that describes a battery connector assembly comprising a connecting member comprising a cap-shaped component featuring a flange, with the connector slipped on the cap-shaped component until having the flange acting as an abutment; and a brochure called "DataSafe HX Front Terminal Batteries" that describes a connection assembly comprising L-shaped components that allows maintenance of the battery cell connections from the front of the arrangement instead of the top.

None of prior art documents provide adequate solutions with regard to the quality of the contact between battery cells and the numbers of components involved therein.

SUMMARY

One general aspect includes a connector assembly for electrically connecting poles of two adjacent battery cells, the connector assembly including: —an electrically conductive bus bar having a first connection area and a second connection area distal from each other. The connector assembly also includes—electrically conductive pole-mating components having a pole-mating face and a bar-mating face, the pole-mating face adapted for mating with one of the poles of one of the two adjacent battery cells, and the bar-mating face for mating with one of the first connection area and the second connection area. The connector assembly also includes—fastening components each for attaching the electrically conductive bus bar and one of the pole-mating components to one of the poles of the two adjacent battery cells. The connector assembly also includes where the bar-mating face and the first and the second connection areas have complementary concave/convex arched shapes for optimizing a contact surface over a range of relative positioning of the two adjacent battery cells.

Implementations may include one or more of the following features. The connector assembly where the first connection area and the second connection area have a concave surface and the bar-mating face has a convex surface. The connector assembly where the concave surface has a diameter which is greater than a diameter of the convex surface. The connector assembly where the fastening components include a bolt passing through the electrically conductive bus bar and one of the pole-mating components to attach to one of the poles. The connector assembly where the fastening components include a resilient member maintaining a pressure over the electrically conductive bus bar over the range of relative positioning of the two adjacent battery cells. The connector assembly where at least one of the electrically conductive bus bar and the pole-mating components is made of a single material. The connector assembly where a radius of curvature of the bar-mating face is about between 5 mm to 50 mm. The connector assembly where a ratio of a distance between a center of having the first connection area and a center of the second connection area to a radius of curvature the first connection area or a radius of curvature of the second connection area is about between seven (7) and fifteen (15). The connector assembly where the pole-mating components include a hole of a first minimum diameter and the electrically conductive bus bar includes holes of a second maximum diameter greater than the first minimum diameter. The connector assembly where the electrically conductive bus bar includes a body, where the body is straight between the first connection area and a second connection area. The electrically conductive bus bar where the electrical conductive bus bar is made of a single material. The electrically conductive bus bar further including holes passing through the first connection area and the second connection area. The electrically conductive bus bar where the body defines a straight line between the first connection area and the second connection area. The electrically conductive bus bar where a ratio of a distance between a center of having the first connection area and a center of the second connection area to a radius of curvature the first connection area or a radius of curvature of the second connection area is about between seven (7) and fifteen (15). The connector assembly where the pole-mating component and the bar-mating component are made of the same material. The connector assembly where the pole-mating component and the bar-mating component include a hole passing therethrough. The connector assembly where the pole-mating component and the bar-mating component contacting through their adaptive-mating faces define together a cylindrical shape.

One general aspect includes an electrically conductive bus bar for electrically connecting poles of two adjacent battery cells where the poles each have a mating face of a spheroid shape, the electrically conductive bus bar including: —a first connection area having a spheroid shape. The electrically conductive bus bar also includes—a second connection area having a spheroid shape distal from each other. The electrically conductive bus bar also includes—a body electrically connecting the first connection area to the second connection area. The electrically conductive bus bar also includes where the spheroid shapes of the first connection area and of the second connection area are complementary to the spheroid shapes of the mating faces of the poles of the two adjacent battery cells for optimizing contact surface over a range of relative positioning of the two adjacent battery cells.

Implementations may include one or more of the following features. The electrically conductive bus bar where the electrical conductive bus bar is made of a single material. The electrically conductive bus bar further including holes passing through the first connection area and the second connection area. The electrically conductive bus bar where the body defines a straight line between the first connection area and the second connection area. The electrically conductive bus bar where a ratio of a distance between a center of having the first connection area and a center of the second connection area to a radius of curvature the first connection area or a radius of curvature of the second connection area is about between seven (7) and fifteen (15). The connector assembly where the pole-mating component and the bar-mating component are made of the same material. The connector assembly where the pole-mating component and the bar-mating component include a hole passing therethrough. The connector assembly where the pole-mating component and the bar-mating component contacting through their adaptive-mating faces define together a cylindrical shape.

One general aspect includes a connector assembly for electrically connecting a pole of a first battery cell to an electrically conductive bus bar connected to a pole of an adjacent battery cell, the connector assembly including: —an electrically conductive pole-mating component including a pole-mating face for mating with the pole of the first battery cell and a first adaptive-mating face. The connector assembly also includes—an electrically conductive bar-mating component including a bar-mating face for mating with the electrically conductive bus bar and a second adaptive-mating face. The connector assembly also includes where the first adaptive-mating face and the second adaptive-mating face have complementary concave/convex arched shapes for mating with each other and optimizing a contact surface over a range of positioning of the adjacent battery cell relative to the first battery cell.

Implementations may include one or more of the following features. The connector assembly where the pole-mating component and the bar-mating component are made of the same material. The connector assembly where the pole-mating component and the bar-mating component include a hole passing therethrough. The connector assembly where the pole-mating component and the bar-mating component contacting through their adaptive-mating faces define together a cylindrical shape.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1B:
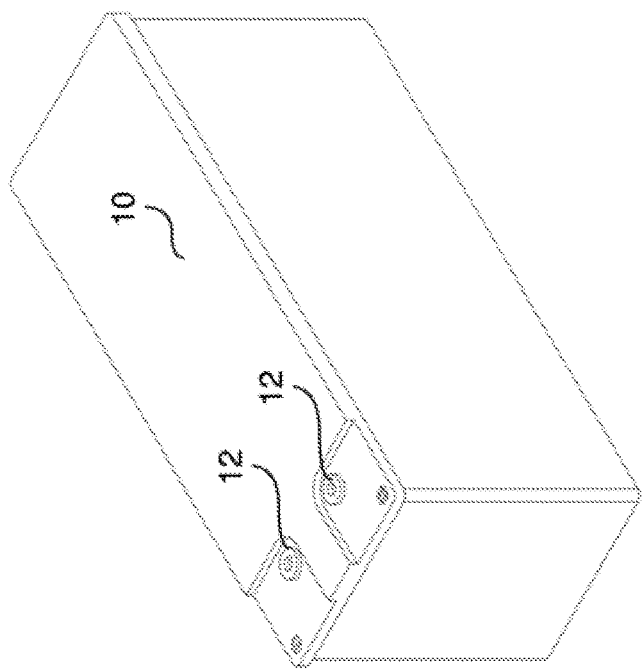
FIGS. 1a and 1b are perspective views of battery cells to be used in relation with embodiments of the present battery connector assembly.
Figure 1A:
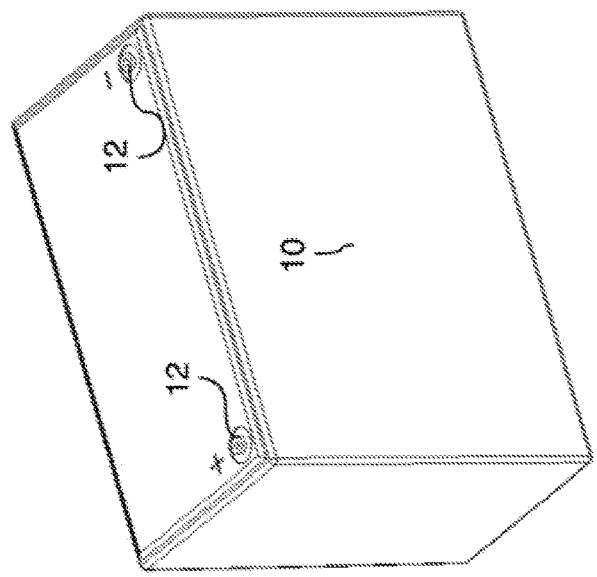

Referring now to the drawings, and more particularly to FIGS. 1a and 1b, battery cells 10 to be used in relation with the battery connector assembly are illustrated. The battery cells 10 presents two poles 12 located on the top side of the battery cells 10.

Figure 2:
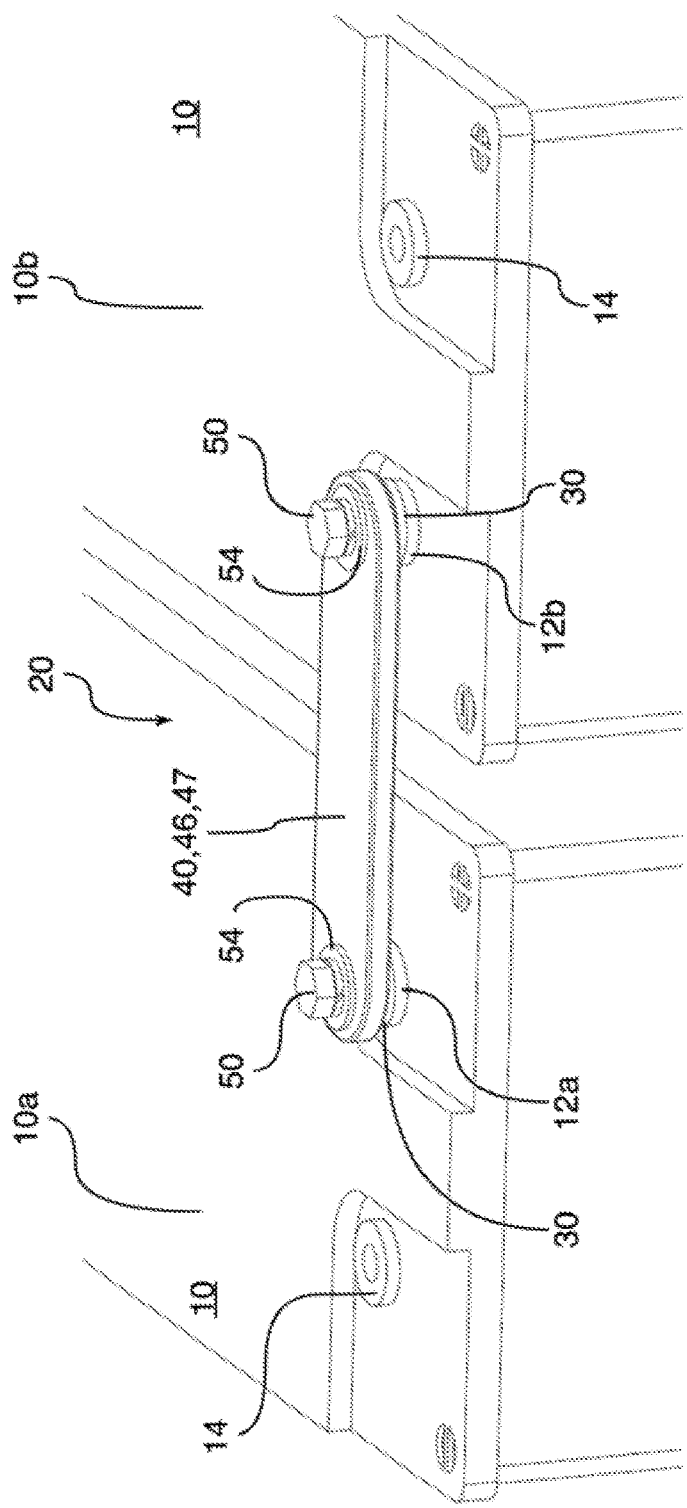
FIG. 2 is a perspective top view of a connector assembly electrically connecting poles of two adjacent battery cells in accordance with an embodiment.

Now referring to FIG. 2, a battery connector assembly 20 is illustrated electrically connecting two adjacent battery cells 10 in a serial fashion. The connector assembly 20 connects one battery cell 10a having a pole (or terminal) of positive polarity 12a (hereinafter called positive pole 12a) to a pole (or terminal) of negative polarity 12b (hereinafter called negative pole 12b) of the adjacent battery cell 10b.

Further shown on FIGS. 3-4, the connector assembly 20 comprises a pair of electrically conductive pole-mating components 30, an electrically conductive bus bar 40 and fastening components (detailed below).

Figure 7A:
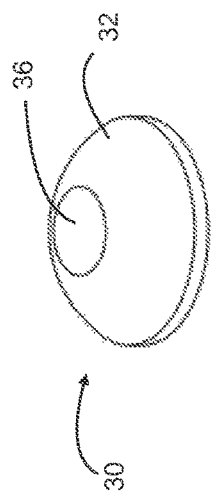
FIGS. 7a to 7c are respectively a perspective view, a top view and a side view of an embodiment of a pole-mating component.
Figure 7B:
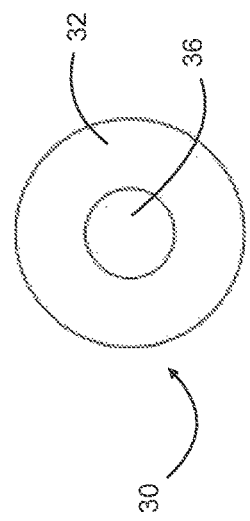
Figure 7C:
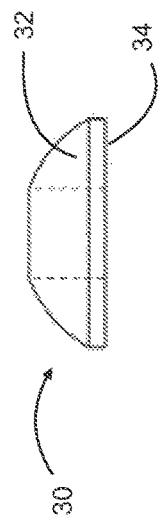
Figure 8A:
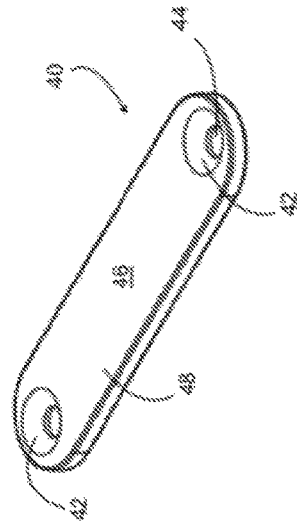
FIGS. 8a to 8e are respectively a top perspective view, a bottom perspective view, a front view, a side view and a bottom view of an embodiment of a bus bar.
Figure 8B:
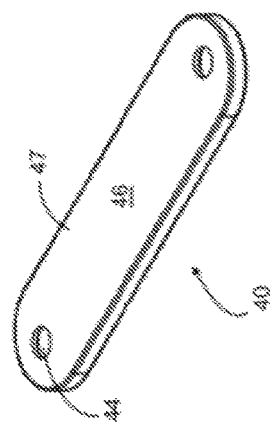
Figure 8C:
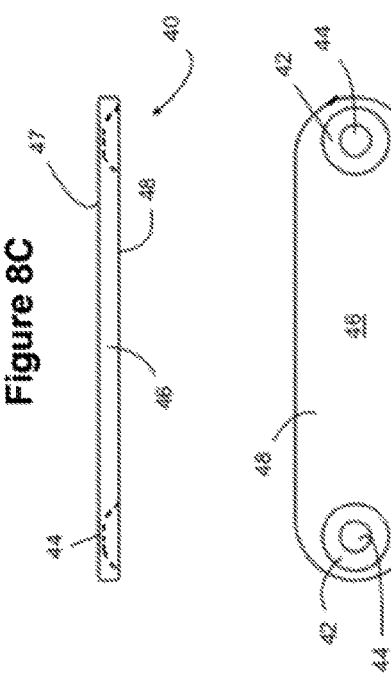
Figure 8D:
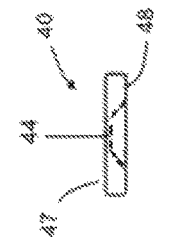
Figure 8E:
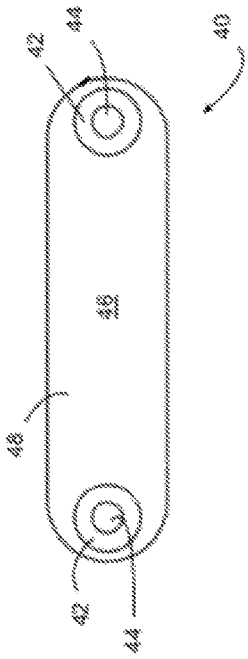

Referring additionally to FIGS. 7a-7c, each one of the pair of electrically conductive pole-mating components 30 has a pole-mating face 34, a bar-mating face 32 and a hole 36 going through the electrically conductive pole-mating component 30. The electrically conductive pole-mating components 30 are made of electrically conductive material and could be plated for preventing corrosion or improving conduction and reducing contact resistance.

Referring additionally to FIGS. 8a-8e, the electrically conductive bus bar 40 has a body 46 having a top face 47 and a bottom face 48, connection areas 42 (aka the first connection area and the second connection area or the first and the second connections areas) located at the bottom face 48 of the electrically conductive bus bar 40 and distant from each other, and bar holes 44 going through the body 46 into the connection areas 42 of the electrically conductive bus bar 40. The electrically conductive bus bar 40 is made of electrically conductive material. The conductive bus bar 40 is configured as a rounded-edge rectangular-section bar. One must understand that alternative shapes of conductive bus bars 40 may be used, having rounded portions or not, and having a more or less rigid connection portion electrically connecting the two connection areas 42. Other alternatives include non-rounded, or a square edges conductive bus bar 40.

The fastening components consist in a pair of bolts 50 with associated washers 54. Examples of washer types include flat face washers. Selection of one type of washer versus another is a question of technical requirements, for example in transportation vehicles or static conditions.

When in function, the electrically conductive pole-mating components 30 electrically connect the poles 12a, 12b (respectively) to the electrically conductive bus bar 40. The pole-mating face 34 is configured to mate with the pole top face 14 of the poles 12a, 12b. The pole-mating face 34 has a configuration complementing the configuration of the pole top face 14, normally consisting in a flat surface, which optimizes the contact area between the pole-mating face 34 and the top faces of the poles 12a, 12b (respectively).

The bar-mating face 32 is configured to mate with a connection area 42 of the electrically conductive bus bar 40. Thus, when installed, the electrically conductive pole-mating components 30 electrically connect the poles 12 of the adjacent battery cells 10 to the electrically conductive bus bar 40.

The bar-mating faces 32 and the connection area 42 have complementary configurations/shapes; i.e., their surfaces are made to match each other. According to an embodiment, the bar-mating faces 32 have a convex arched shape (i.e., a convex surface) while the connection area 42 has a concave arched shape (i.e., a concave surface). The complementarity of the concave and convex arched shapes optimizes the contact area between the bar-mating face 32 and the connection area 42. That optimization is intended to allow positions/alignment of the adjacent battery cells 10 which are non-ideal as movement of the adjacent battery cells 10 relative to each other after the installation without affecting the quality of the electric connection between them.

Furthermore, the diameter of the connection area 42 is designed to be slightly greater than the diameter of the bar-mating faces 32, the difference in diameter ensuring optimal contact surface of the whole surface of the bar-mating face 32 with the connection area 42 regardless of the alignment of the battery cells 10.

Accordingly, flexibility in the angular arrangement (in all directions) of the battery cells 10 is provided through the use of the present connection assembly 20. Practically, having one battery cell 10 higher than the other, or not exactly aligned with the other will have a minimized effect on the quality of the electric connection between the poles 12a, 12b of the two adjacent battery cells 10. The solutions thereby provide satisfactory electrical connections between the poles 12a, 12b of two adjacent battery cells 10 while providing multiple degrees of freedom in the relative movement and position of the two adjacent battery cells 10.

More specifically, the poles 12a, 12b may be independently shifted regarding their ideal alignment without influencing the pole connection. In other words, the solution resolves installation problems such as one battery cell 10 being slightly in front of the other, one battery cell 10 being slightly higher than the other, and slight misalignment of a pole 12 on a battery cell 10 during fabrication. These problems are corrected while still having the battery cells 10 installed at a preset distance therebetween for heat dissipation.

Figure 3:
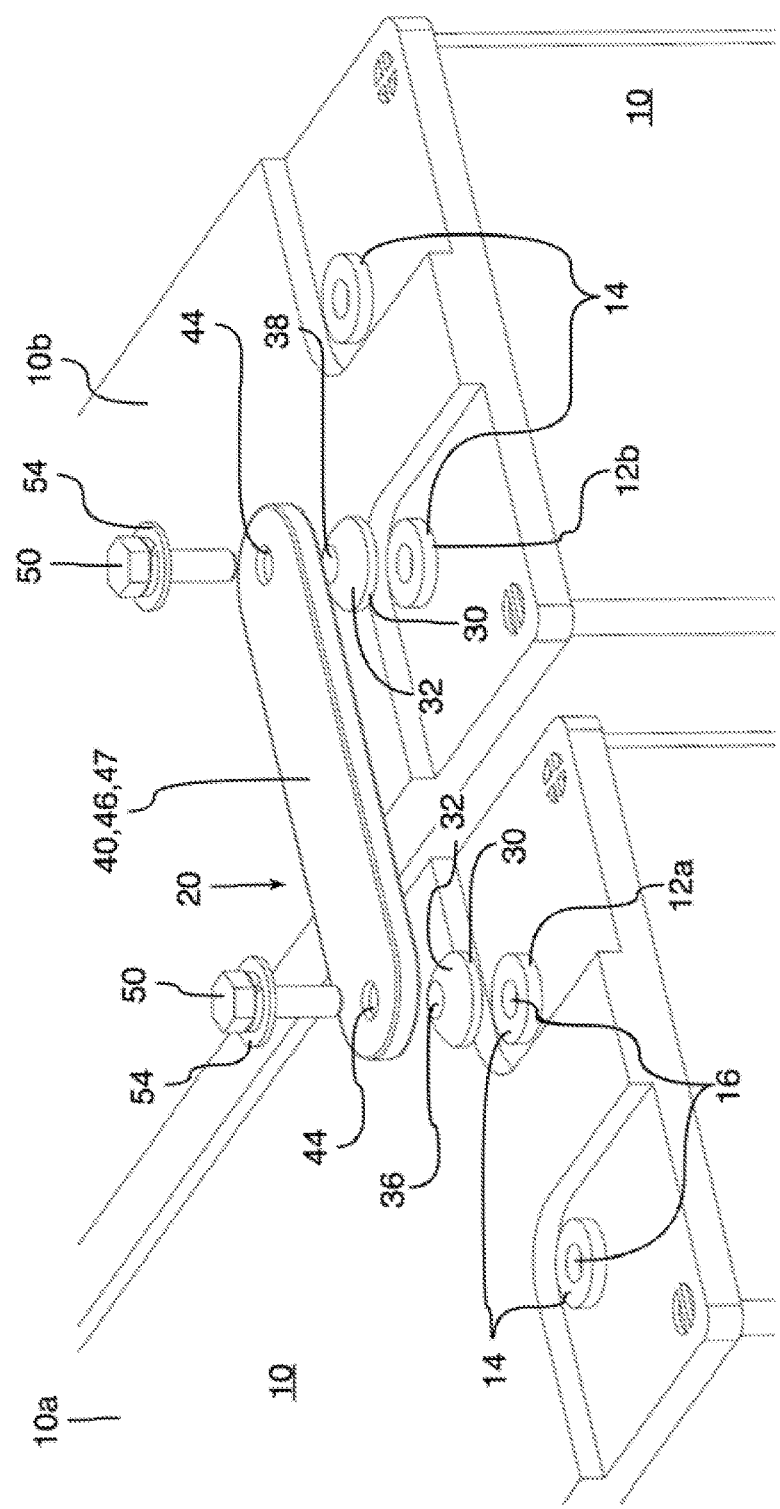
FIG. 3 is a top exploded view of the components of the connector assembly of FIG. 2.
Figure 4:
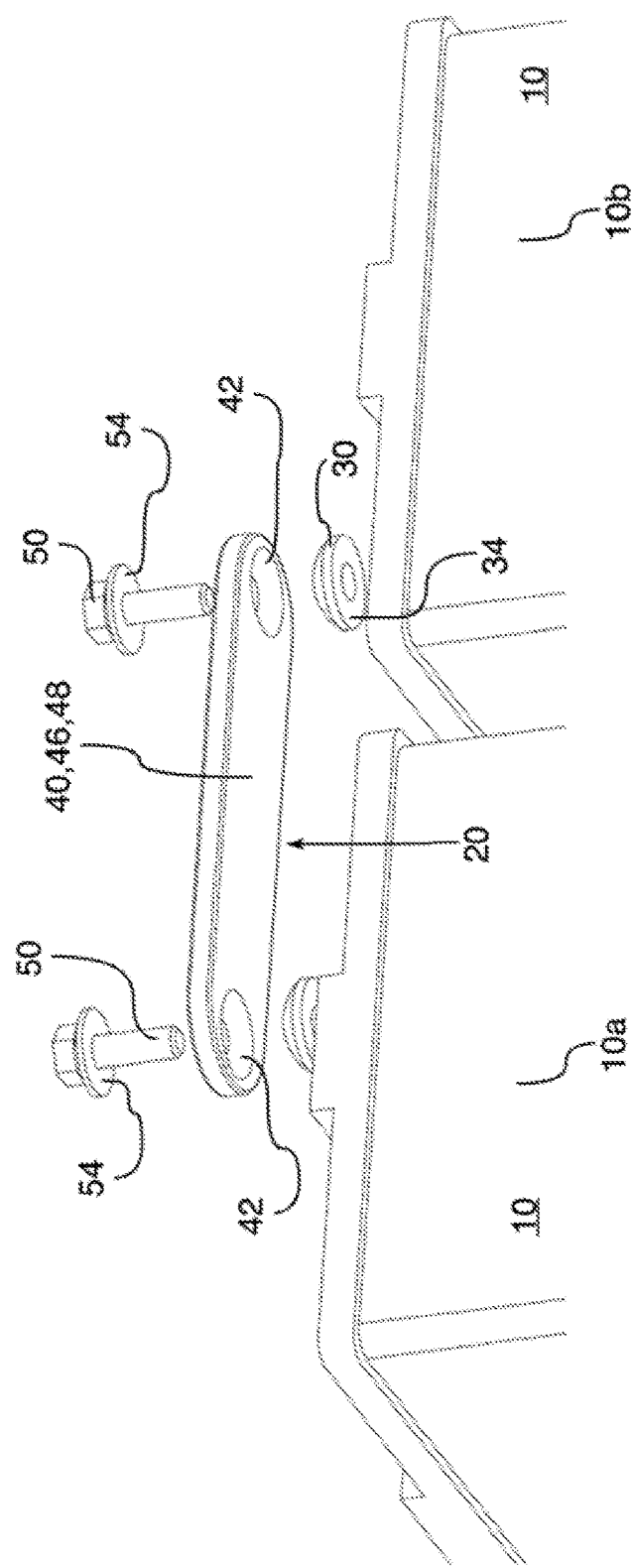
FIG. 4 is a front exploded view of the components of the connector assembly of FIGS. 2 and 3.

Still referring to FIGS. 2 to 4, the electrically conductive bus bar 40, through the connection areas 42 and its body 46 connecting the connection areas 42, defines a connection between the electrically conductive pole-mating components 30, thus between the poles 12a, 12b.

The fastening components are configured for fastening the combination of an electrically conductive pole-mating component 30 and the electrically conductive bus bar 40 to each of the positive pole 12a and negative pole 12b of the connected adjacent battery cells 10a, 10b. Fastening is performed by inserting each bolt 50, through a bar hole 44 and the hole 36 of the electrically conductive pole-mating component 30, into the pole hole 16 of the poles 12. The bolt 50 and the associated washer 54 abut on the top face 47 of the electrically conductive bus bar 40, ensuring a good contact between the connection area 42 and the bar-mating face 32 of each of the electrically conductive pole-mating components 30.

One must note that the mounting torque to be applied to the bolt 50 is selected in relation with the conductive contact and conductive material to provide an optimal pressure on the components and thus an optimal contact connection for conductivity.

Accordingly, the new connector assembly 20 provides an economical solution for easily connecting poles 12 of adjacent battery cells 10 without having to ensure overly the alignment of the battery cells 10.

According to an embodiment, the arched shape is a spheroid (i.e., a spheroid shape), featuring exactly the same arc from the center perspective to the periphery of the arched-shape featuring component regardless of the orientation.

According to an embodiment, the holes 36 and 44 go through the center of the arched shapes. Accordingly, regardless the angular orientation of the battery cells 10 with respect to each other, the electric contact is maintained at the same quality level.

According to an embodiment, the bar holes 44 have a slightly conic shape or a diameter slightly greater than the diameter of the bolt 50. According to an embodiment, the slightly conic holes 36 and 44 define diameters that increase with the elevation of the hole portion relative to the surface of the pole 12a, 12b. Accordingly, the orientation of the electrically conductive bus bar 40 may slightly vary from a horizontal configuration without affecting the fastening of the electrically conductive bus bar 40 on the electrically conductive pole-mating component 30.

According to an embodiment, the washers 54 is a resilient member or comprises a resilient member portion featuring a resilient quality allowing the washers 54 to be compressed slightly at some angle relative to the horizontal when the conductive bus bar 40 is slightly misaligned. According to an embodiment (not illustrated), a spring or other resilient material is installed between the washer 54 and the head of the bolt 50 to maintain pressure over the washer 54 and accordingly the top face 47 of the conductive bus bar 40 regardless of misalignment.

According to alternative embodiments (not illustrated), alternative fastening components may be used, including additional washers, different washer configurations and alternative fastening solutions to the bolt 50 such as pins, clips, rivets, inserts, fasteners, etc.

According to embodiments, the fastening components may operate through the pole-mating component 30 and the conductive bus bar 40 such as using a bolt 50 as in the illustrated embodiment. According to other embodiments (not illustrated), the fastening components externally fasten the pole-mating component 30 and the conductive bus bar 40 to the pole 12a, 12b by, for example, using a clip cooperating with diametrically opposite locations at the base of the pole 12a, 12b, and extending over the top face 47 of the conductive bus bar 40; the clip pushing the conductive bus bar 40 towards the pole 12a, 12b.

Regardless of the selected fastening solution, the fastening components allow slight misalignment and/or movement of the conductive bus bar 40 relative to the poles 12a,12b.

According to alternative embodiments (not illustrated), the complementary convex/concave arched shapes may be inverted from the ones illustrated on FIGS. 3 and 4 and associated described embodiment, having the bar-mating face 32 featuring a concave arched shape while the connection area 42 of the electrically conductive bus bar 40 features a convex arched shape.

Figure 5:
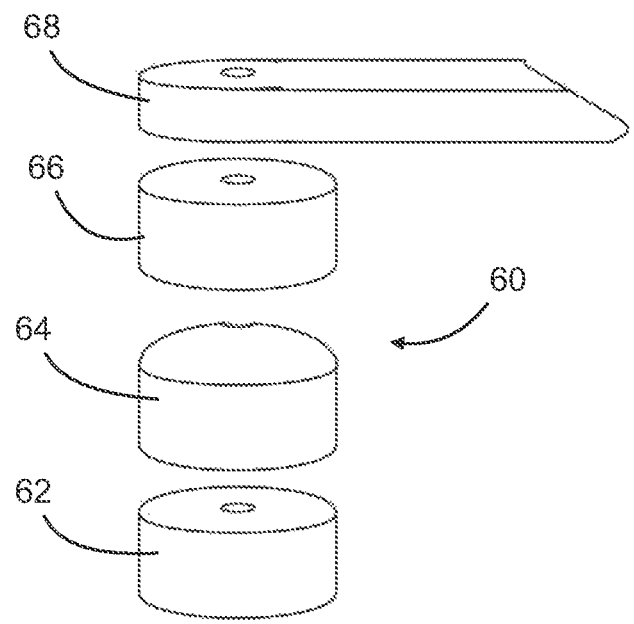
FIG. 5 is a perspective exploded view of the components of a connector assembly according to an embodiment.
Figure 6:
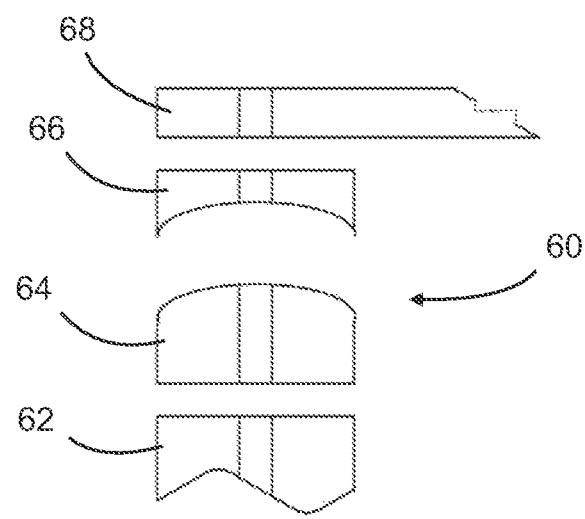
FIG. 6 is an exploded view of the components of the connector assembly of FIG. 5 according to a cutting plane passing through the center of the components.

Now referring to FIGS. 5 and 6, a connector assembly 60 according to another embodiment comprises an electrically conductive pole matting component 64 and an electrically conductive bar-matting component 66 connecting at one end to a first pole 62 (similar to poles 12*a*, 12*b*), and at the other end to an electrical bus bar 68. The pole 62 and the bus bar 68 feature flat faces connecting to the connector assembly 60 through a pole-matting face and a bar-matting face. The components 64 and 66 feature complementary concave/convex arched shapes of adaptive matting faces for matting with each other. The components 64 and 66 combined together have a substantially cylindrical shape.

Figure 9:
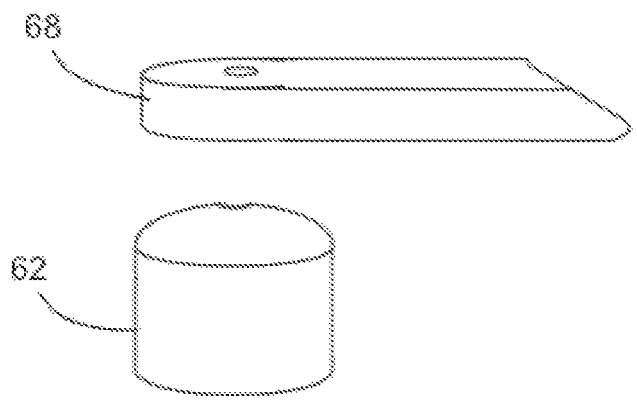
FIG. 9 is a perspective exploded view of the components of a connector assembly according to an embodiment.
Figure 10:
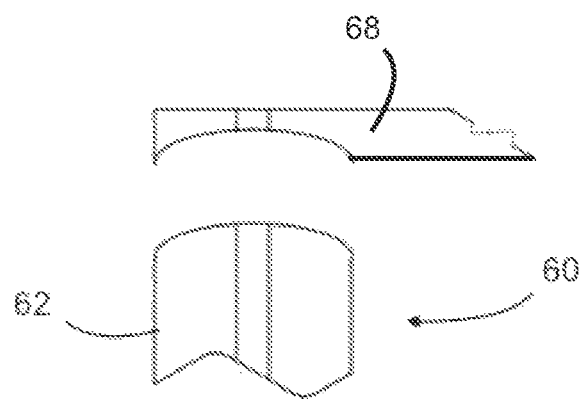
FIG. 10 is an exploded view of the components of the connector assembly of FIG. 9 according to a cutting plane passing through the center of the components.

Now referring to FIGS. 9 and 10, a connector assembly according to another embodiment comprises an electrical bus bar 40 (see also FIG. 8*a*-8*e*) connecting at each end to a pole 72 (similar to poles 12*a*, 12*b*). The pole 72 and the bus bar 40 feature complementary concave/convex arched shapes of adaptive matting faces for matting with each other.

According to embodiments, in order to encompass evolution in the field of battery cells and battery poles, available embodiments comprise fastening a component contacting a pole of a shape alternative to one of a circular shape, such as a rectangular shape, a square shape, an elliptical shape, and alternative regular and irregular shapes. Battery pole manufacturing may adopt a shape having an arched top surface (e.g., convex or concave), with a contacting component having a matching shape as herein described. Accordingly, the present development is adapted to respond to many developments in the field of battery cells while maintaining the present advantages.

The connector assembly 60 and the bus bar 68 attach to the pole 62 using a similar fashion as the previous embodiment. In the illustrated embodiment, the connector assembly 60, the bus bar 68 and the pole 62 features holes for attachment using a bolt. As above, alternative fastening solutions are available.

According to embodiments, the electrically conducting components (pole-matting components 30, 64, 66 and the conductive bus bar 40, 68 may be made of a single material or a combination of materials comprising at least one electrically conductive material electrically connecting the connecting surfaces. According to an embodiment, the electrically conductive material is covered with non-conductive material on at least some of the non-connecting surfaces. According to an embodiment, the core of at least one of these components is made of non-conductive material covered (plated) with the electrically conductive material.

According to embodiments, the radius of curvature of the bar-mating face 32 is variable and optimized to equipment or battery current rating). According to an embodiment, the radius of curvature of the bar-mating face 32 is about between 5 mm to 50 mm. According to an embodiment, the radius of curvature of the bar-mating face 32 is about between 12 mm to 16 mm.

According to embodiments, the ratio of the distance between the centers of the bar holes 44 to the radius of curvature of the bar-mating face 32 or the connection areas 42 is variable according to the desired relative allowed misalignment or displacement between the two batteries or batteries and other components. It also allows optimal spacing between components considering misalignment. According to an embodiment, the ratio of the distance between the centers of the bar holes 44 to the radius of curvature of the bar-mating face 32 or the connection areas 42 is between about 7 and 15. According to an embodiment, the ratio of the distance between the centers of the bar holes 44 to the radius of curvature of the bar-mating face 32 or the connection areas 42 is between about 9 and 11. It is also contemplated that the radius of curvature each of the connection areas 42 on the same conductive bus bar 40 is different in order to adapt to poles 12*a* and 12*b* having differing shapes.

One must note that an advantage provided by embodiments relative to existing methods of connecting poles of neighbor battery cells 10 resides in the connector assembly preventing inducing tension or forces over the poles since allowing misalignment of the poles. Existing "rigid" battery connectors induce tension, compression, torque or force over misaligned poles that may shorten the life of the battery cells 10.

One must also understand that the present connector assembly, since connecting poles on top of battery cells 10, and not having to travel in front of the battery cells 10, allows to measure voltages closer to the battery cells 10, decreasing the potential sources of mismeasurements that increase as one measures farther from the desired object to be measured.

As a general note, directions such as "vertical" or "horizontal" are used for the purpose of intelligibility to describe orientation of parts. It will be understood that these terms refer to the perpendicularity of parts between them and to the usual orientation in which they are expected to be used. However, the poles 12*a*, 12*b* of the battery cells 10 could be in other directions such as in front of the battery cells 10, which implies that the terms "horizontal" and "vertical" would not have to same signification; these terms depending on the orientation references imposed by the locations of the poles 12*a*, 12*b*.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A connector assembly for electrically connecting poles of two adjacent battery cells, the connector assembly comprising:
   an electrically conductive bus bar having a first connection area and a second connection area distal from each other;
   electrically conductive pole-mating components having a pole-mating face and a bar-mating face, the pole-mating face adapted for mating with one of the poles of one of the two adjacent battery cells, and the bar-mating face for mating with one of the first connection area and the second connection area; and
   fastening components each for attaching the electrically conductive bus bar and one of the pole-mating components to one of the poles of the two adjacent battery cells, wherein the bar-mating face and the first and the second connection areas have complementary concave/convex arched shapes for optimizing a contact surface over a range of relative positioning of the two adjacent battery cells.

2. The connector assembly of claim 1, wherein the first connection area and the second connection area have a concave surface and the bar-mating face has a convex surface.

3. The connector assembly of claim 2, wherein the concave surface has a diameter which is greater than a diameter of the convex surface.

4. The connector assembly of claim 1, wherein the fastening components comprise a bolt passing through the electrically conductive bus bar and one of the pole-mating components to attach to one of the poles.

5. The connector assembly of claim 1, wherein the fastening components comprise a resilient member maintaining a pressure over the electrically conductive bus bar over the range of relative positioning of the two adjacent battery cells.

6. The connector assembly of claim 1, wherein at least one of the electrically conductive bus bar and the pole-mating components is made of a single material.

7. The connector assembly of claim 1, wherein a radius of curvature of the bar-mating face is about between 5 mm to 50 mm.

8. The connector assembly of claim 1, wherein a ratio of a distance between a center of having the first connection area and a center of the second connection area to a radius of curvature the first connection area or a radius of curvature of the second connection area is about between seven (7) and fifteen (15).

9. The connector assembly of claim 1, wherein the pole-mating components comprise a hole of a first minimum diameter and the electrically conductive bus bar comprises holes of a second maximum diameter greater than the first minimum diameter.

10. The connector assembly of claim 1, wherein the electrically conductive bus bar comprises a body, wherein the body is straight between the first connection area and a second connection area.

11. An electrically conductive bus bar for electrically connecting poles of two adjacent battery cells wherein the poles each have a mating face of a spheroid shape, the electrically conductive bus bar comprising:
    a top face and a bottom face opposed to the top face, wherein the bottom face comprises:
    a first connection area having a spheroid shape;
    a second connection area having a spheroid shape distal from each other; and
    holes passing through the bus bar about the first connection area and the second connection area, each hole being for passage of a fastening component attaching the electrically conductive bus bar to one of the poles of the two adjacent battery cells with the top face comprising an area about each of the holes for the fastening component to press against the bus bar towards the pole;
    and
    a body electrically connecting the first connection area to the second connection area, wherein the spheroid shapes of the first connection area and of the second connection area are complementary to the spheroid shapes of the mating faces of the poles of the two adjacent battery cells for optimizing contact surface over a range of relative positioning of the two adjacent battery cells.

12. The electrically conductive bus bar of claim 11, wherein the electrical conductive bus bar is made of a single material.

13. The electrically conductive bus bar of claim 11, wherein the holes passing have a first diameter and the fastening components have a second diameter, and wherein the first diameter is greater than the second diameter.

14. The electrically conductive bus bar of claim 11, wherein the body defines a straight line between the first connection area and the second connection area.

15. The electrically conductive bus bar of claim 11, wherein a ratio of a distance between a center of having the first connection area and a center of the second connection area to a radius of curvature the first connection area or a radius of curvature of the second connection area is about between seven (7) and fifteen (15).

16. A connector assembly for electrically connecting a pole of a first battery cell to an electrically conductive bus bar connected to a pole of an adjacent battery cell, the connector assembly comprising:
    an electrically conductive pole-mating component comprising a pole-mating face for mating with the pole of the first battery cell and a first adaptive-mating face; and
    an electrically conductive bar-mating component comprising a bar-mating face for mating with the electrically conductive bus bar and a second adaptive-mating face; and
    wherein the first adaptive-mating face and the second adaptive-mating face have complementary concave/convex arched shapes for mating with each other and optimizing a contact surface over a range of positioning of the adjacent battery cell relative to the first battery cell.

17. The connector assembly of claim 16, wherein the pole-mating component and the bar-mating component are made of the same material.

18. The connector assembly of claim 16, wherein the pole-mating component and the bar-mating component comprise a hole passing therethrough.

19. The connector assembly of claim 16, wherein the pole-mating component and the bar-mating component contacting through their adaptive-mating faces define together a cylindrical shape.

* * * * *